United States Patent [19]

Sirén

[11] 4,242,226

[45] Dec. 30, 1980

[54] FILTER MATERIAL AND A METHOD OF MANUFACTURING AND USING THE SAME

[76] Inventor: Matti J. Sirén, Casa Maria Helena, Via Monte Cucco, 6596 Gordola, Switzerland

[21] Appl. No.: 13,442

[22] Filed: Feb. 21, 1979

[30] Foreign Application Priority Data

Feb. 21, 1978 [SE] Sweden ............................ 7802006
Feb. 21, 1978 [SE] Sweden ............................ 7802007

[51] Int. Cl.³ ............................................. C01B 31/08
[52] U.S. Cl. ..................................... 252/422; 55/74; 210/502; 252/447; 260/124 R
[58] Field of Search ............... 210/31 C, 36, 37, 510; 55/74, 387, 524; 264/29.7; 252/422, 423; 260/124

[56] References Cited

U.S. PATENT DOCUMENTS

| | | | |
|---|---|---|---|
| 1,530,536 | 3/1925 | Adler | 252/425 |
| 1,535,797 | 4/1925 | Wickenden | 252/422 |
| 1,535,798 | 4/1925 | Wickenden | 252/422 |
| 2,701,792 | 2/1955 | Owen | 210/36 |
| 3,850,798 | 11/1974 | Sjoquist | 210/31 C |
| 3,873,514 | 3/1975 | Chu et al. | 210/31 C |
| 3,886,093 | 5/1975 | Dimith | 252/422 |
| 3,997,638 | 12/1976 | Manny et al. | 264/29.7 |
| 4,062,368 | 12/1977 | Crellin et al. | 55/387 |
| 4,113,651 | 9/1978 | Chornet | 252/422 |

FOREIGN PATENT DOCUMENTS

| | | | |
|---|---|---|---|
| 164172 | 7/1958 | Sweden | 55/74 |
| 9181168 | 7/1968 | Sweden | 55/74 |
| 1473701 | 5/1974 | United Kingdom | 55/74 |

OTHER PUBLICATIONS

Ullmanns Encyklopadie der Technischen Chemie, Third Edition (1957), vol. 9, pp. 804–805.

*Primary Examiner*—Theodore A. Granger
*Attorney, Agent, or Firm*—Fleit & Jacobson

[57] ABSTRACT

A filter material by which substances contained in gaseous or liquid media can be removed comprises a product in the form of a matrix of activated carbon. The product has uniformly dispersed therein at least one metal taken from the group Ca, Mg, Ba, Al, Cu, and the transition metals and is obtained by chemically reacting cations which comprise at least one of said metals from said group with anionic groups chemically bound to a polyhexose derivative.

30 Claims, No Drawings

FILTER MATERIAL AND A METHOD OF MANUFACTURING AND USING THE SAME

The present invention relates to filter material for gaseous or liquid media, and relates more particularly to a filter material which comprises predominantly activated carbon in which active metal groups have been incorporated by a chemical reaction between a starting substance and one or more metal compounds. The invention also relates to a method of manufacturing such a filter material, and to a filter and the use of a filter containing such filter material.

By activated carbon is generally meant black, solid carbonaceous material, such as charcoal, bone charcoal, sugar charcoal, carbon produced from oil products, coconut carbon etc., which remain subsequent to the decomposition of organic material by pyrolysis and which during or after the pyrolysis have undergone an activating process. Activated carbon is a porous material whose most characteristic features are its high carbon content and large specific surface area. Thus, activated carbon is not a homogenous, well defined material, but rather a mixture of amorphous carbon and graphite crystals, the ratios therebetween depending upon many factors, all of which are not known, although the choice of starting material from which the carbon is derived plays a decisive part in the properties of the activated carbon produced.

The capture of substances in a filter made of activated carbon takes place chiefly through physical sorption, chemical sorption and catalytic reactions. It has been found in this respect that the presence of certain metals on the filter material used can promote the efficiency and selectivity of the filtering process. In line herewith it has been proposed that activated carbon is impregnated with different metal compounds, thereby to obtain an activated carbon whose surface is partially covered with a desired metal compound. One disadvantage with this physical impregnation of activated carbon with metal compounds, however, is that the interior of the carbon cannot be reached by the liquid, metal-containing impregnating solutions, since the very tiny pores at the surface of the carbon particles prevent further penetration of the impregnating solution, thereby rendering homogenous impregnation of the carbon particles impossible. Further, this physical impregnation of the activated carbon causes partial blocking of the pores of the carbon particles, resulting in an appreciable reduction of the active surface area thereof. Further, it is not possible to control to any large extent the metal applied to the carbon particles by impregnation with regard to the total quantity of the metal and the distribution of the metal on and in the carbon particles, and hence there is a risk that the metal will agglomerate in an undesirable manner on the carbon particles.

An activated carbon material rich in metal can be obtained by pyrolysing bone and activating the pyrolysed product. The activated carbon content of the thus obtained product, i.e. so-called bone charcoal, is much too low, however, for the majority of filtering purposes. The metal compounds, mainly calcium phosphates, are namely of the order of magnitude of from 90–95 percent by weight, and hence bone charcoal can, in principle, be considered to comprise a matrix of calcium salts which are coated with carbon.

It has been found that an activated carbon material having metal substantially uniformly distributed therein can be manufactured by precipitating, for example, potassium or sodium lignate solutions with a solution of a salt of a transition metal, with subsequent pyrolysis and activation of the precipitate. The metal content which can be achieved in this manner, however, is much too low for the majority of fields of use and it is difficult to predetermine the properties of the thus produced material owing to the substantially undefined structure of the lignin.

An object of the present invention is to provide a novel and improved filter material which can be used for filtering gaseous and liquid media and which is of the kind comprising a basic substance formed from activated carbon in which active metal groups or metal compounds are uniformly dispersed, wherewith the amount of said metal in relation to the amount of activated carbon can be reproduceably adjusted to an optimal value, namely within the range of 10–50 percent by weight, preferably 10–35 percent by weight, at the same time as the metal groups are particularly uniformly distributed within the filter material.

To this end there is proposed in accordance with the invention a filter material which contains a product in the form of a matrix of activated carbon having uniformly dispersed therein at least one metal taken from the group Ca, Mg, Ba, Al, Cu and the transition metals, said product being formed by chemical reaction between, on one hand, cations comprising at least one metal from said group of metals, and on the other hand, anionic groups chemically bound to a polyhexose derivative, whereafter said product is pyrolysed and activated.

In accordance with a preferred embodiment of the invention, in order to provide a particularly uniform and readily reproduceable quality, the activated carbon may have been formed substantially by pyrolysis and activation of a cellulose derivative or a starch derivative of natural or synthetic origin and reacted with said metal, for example a cellulose or starch derivative originating from natural starch or inulin or comprising dextran. Mixtures of such natural and synthetic starting materials can also be used for adjusting the properties of the activated carbon produced therefrom. Suitably, the polyhexose derivative comprises an acid polyhexose derivative, and preferably the anionic groups of said polyhexose derivative comprise carboxyl groups, sulphonic acid groups or phosphoric acid groups. Preferably said polyhexose derivative has introduced therein 1–3 metal cations per hexose unit.

The aforementioned polyhexose derivative can originate, to advantage, from polyhexose or derivatives thereof which have been cross-linked with the aid of a bifunctional compound, such as epichlorohydrin, dichlorohydrin, diepoxybutane etc., optionally whilst applying ionised radiation, to a three-dimensional network with through-passing pores. Subsequent to reacting this three-dimensional network with metal cations and subsequently subjecting the same to pyrolysation, there can be obtained an activated carbon having the very favourable combination of a wide, effective filtering surface and a low resistance to the through-flow of the gas or liquid to be filtered. The starting material and the extent to which the polyhexose or derivatives thereof is or are cross-linked is suitably selected so that said cross-linked polyhexose or polyhexose derivative is obtained in granular form and has a swelling ability in water of 1–50 ml/gram, a swelling ability of 1–10 ml/gram being generally preferred for the manufacture of activated carbon for gas-filtering purposes, while a swelling ability of 10–50 ml/gram is generally preferred for the manufacture of activated carbon for liquid-filtering purposes.

In addition to the metal specified above, the metals which can be used in a filter material according to the invention are primarily the transition metals Ti, V, Cr, Mn, Fe, Co, Ni, Mo and Pd, said metals being selected from the standpoint of the selective effects desired in each filtering process.

In an advantageous filter material for gas or liquids, which exhibits favourable catalytic and adsorbing properties, at least 10 percent by weight of the amount of metal present in said product comprises at least one of the metals Cu, Ti, V, Cr, Fe, Co, Ni, Mo and Pd, whilst the remainder comprises at least one of the metals Ca, Mg, Ba and Al.

It is a particular advantage if the filter material has the form of a granular substance, for example the form of balls or cylinders having a largest cross-dimension of 0.5–3 mm, whereby the manufacture of a filter consisting of said filter material or a filter containing said filter material having a pre-determinable through-flow resistance etc. is facilitated and the dusting problem avoided. For the purpose of obtaining given selective properties, the granules may be coated with a permeable or semipermeable coating, for example a coating of cellulose acetate.

Over recent years, a large number of different filter constructions and filter materials for tobacco have been suggested. In general, the success of these constructions and filter materials with regard to the separation of harmful substances in tobacco smoke have been far from satisfactory. This is understandable in itself, in view of the difficult filtering conditions which prevail when, for example, filtering cigarette smoke. The smoke can be considered to be aerosol containing $10^3$–$10^{10}$ particles per $cm^3$, the diameter of the particles varying from $<0.1$ $\mu m$ to approximately 1 $\mu m$, and the mean diameter of the particles under normal conditions reaching to 0.5–0.6 $\mu m$. The particle phase in the smoke formed by these particles comprises approximately 5–10% of the weight of the smoke, while the remainder of the smoke, about 90–95%, constitutes the gas phase of the smoke, said gas phase comprising mainly oxygen, nitrogen, carbon monoxide and carbon dioxide. The smoke when passing through a cigarette filter may have a velocity as high as 35 cm/sec and the residence time of the smoke, during which it can be brought into contact with the filter material, is consequently only in the order of magnitude of 0.04 seconds in a cigarette filter of normal length. The temperature of the cigarette smoke increases as the glowing end of the cigarette approaches the filter, from approximately room temperature to 75°–90° C.

In a modern tobacco filter, the gas molecules or particles in the smoke have, in principle, no chance of passing through the filter without colliding with the filter material. Filter material normally comprises cellulose acetate fibers, which merely cause a mechanical separation of the particles. It has also been proposed, however, to form the filter material completely or partially of particles of activated carbon; this proposal constitutes a substantial step forward, primarily due to the fact that in this way there is obtained a large increase in the total surface area per unit of volume of filter available for physical adsorption. A disadvantage with known filters made of activated carbon, however, is that they have but small selectivity, i.e. they adsorb, without distinction, form the gas phase also the flavouring substances and the nicotin which the smoker requires. Consequently, the amount of activated carbon in a cigarette filter must be limited, although in so doing the capacity of the filter to adsorb other, undesirable constituents in the smoke is reduced. A further considerable disadvantage with cellulose acetate filters and conventional carbon filters is that they lack the total ability of separating out the most harmful constituents of the smoke, such as cadmium and carbon monoxide. It has been found in recent years, that calcium salts are able to bind cadmium present in tobacco smoke. It has therefore been proposed to incorporate in the cigarette filter suitable inorganic calcium salts, such as calcium phosphate or calcium carbonate. It has been found difficult in practice, however, to introduce into the filter space accessible calcium salts as such, e.g. in powder form, in a quantity such that the requisite contact area between said salts and the smoke is obtained. Even bone charcoal, which as previously mentioned is very rich in inorganic calcium salts, is substantially inactive with regard to the separation of cadmium from tobacco smoke—i.e. when a limited filter space is available and an effective filtering is required at the same time—possibly due to the fact that the specific outer surface of bone charcoal is small in comparison with the surface of the majority of other activated carbon materials.

According to the present invention there is obtained a filter material suitable for filtering tobacco smoke, which filter is able effectively to separate cadmium from tobacco smoke when the metal in the filter material comprises at least substantially Ca, which is preferably present in the form of a salt. The explanation to this may lie in the fact that the calcium salt in the filter material according to the invention is present in the form of heterogenous and very active calcium salt molecules, which are uniformly distributed in the basic substance comprising activated carbon. The amount of Ca in this filter material should be at least 15 percent by weight, for example at least 15–30 percent by weight of said material. Carbon monoxide can also be removed from tobacco smoke to a substantial degree if the metal incorporated in the last mentioned filter material includes Fe and/or Cu, for example in the form of a salt or an oxide. The iron and/or copper present in the filter material according to the invention has or have a strong catalytic effect, which promotes the formation of carbon dioxide from the carbon monoxide and oxygen present in the tobacco smoke. In this respect, the Fe and/or Cu content should exceed one tenth of the Ca-content.

The filter material according to the invention can also be used for other gas- and liquid-filtering purposes, it being possible to construct said filter material in a manner such that it gives rise to selective catalytic effects. An example of suitable metal combinations in the filter materials thus used as a catalyst carrier include Cu, Cr and Ba.

Due to the fact that it is possible to pre-determine the composition of the filter material substantially precisely, the material can be composed and formed for very sophisticated filtering processes, for example for filtering the blood of patients having kidney insufficiencies or poisonous symptoms, to remove toxic substances from the blood. In this case the metal present in the filter material is advantageously taken from the group Ca, Mg and Zr. Metals which, in this context, have a harmful catalytic effect, such as Ti, V, Cr, Fe, Co, Ni, Cu, Zn, Mo and Pd are avoided. Ca is particularly preferred in this connection, owing to its ability to bind heavy metals, such as cadmium, which is generally present in high concentrations in patients suffering from kidney deficiencies. The Ca-content of the filter material is suitably at least 10 percent by weight of said material.

The filter material according to the invention can also be used for selectively taking up and rendering harmless toxic or other undesirable substances in a liquid environment, both in vivo, e.g. in the stomach or the intestinal canal, and in vitro.

The invention also relates to a method of manufacturing the aforedescribed filter material. The method is mainly characterized by the fact that cations comprising at least one metal taken from the group Ca, Mg, Ba, Al, Cu and the transition metals, and anionic groups chemically bound to a polyhexose derivative, are caused to chemically react with each other, whereafter the reaction product is separated, pyrolysed and activated to form a matrix of activated carbon having metal from said group uniformly dispersed therein. As a starting material for said polyhexose derivative there is conveniently used cellulose, starch or inulin, and advantageously there is introduced into the polyhexose derivative a considerable amount of metal, suitably about 10-35 percent by weight metal, preferably 1-3 metal ions per hexose unit. Advantageously there is used an acidic polyhexose derivative, such as a polyhexose derivative whose anionic groups comprise carboxyl groups, sulphonic acid groups or phosphoric acid groups.

Preferably, the filter material is produced in granular form, the simplest and most advantageous procedure being one in which the reaction product obtained by reaction between a metal salt and an acid polyhexose derivative is granulated prior to being pyrolysed and activated. A suitable binder, preferably in a relatively small quantity, such as at most 10 percent by weight, may be added to said reaction product or said starting material, thereby to obtain good granulating properties and/or an increased mechanical strength of the granulate.

A particular advantage can be obtained by using polyhexose derivatives originating from a polyhexose or a polyhexose derivative which has been cross-linked with the aid of a bifunctional compound, such as epichlorohydrin, to form a three-dimensional matrix having through-going pores. The metal cations can bind to the said anionic groups, either prior to, during of subsequent to the cross-linking reaction, it being possible to select the starting material and the degree of cross-linking such that the cross-linked material is automatically obtained in granular form with open pores extending from surface to surface, wherewith the granules may have a cross dimension of, for example, 0.005-3 mm. These through-going pores are maintained substantially intact in the activated carbon formed by the cross-linked material containing metal groups. Suitably, there is used a cross-linked polyhexose or a cross-linked polyhexose derivative with a swelling ability in water of 1-50 ml/gram.

For the manufacture of a filter material which is particularly suitable for filtering tobacco smoke, calcium cations are used in a quantity such that the amount of Ca present in said product is at least approximately 10 percent by weight, suitably at least approximately 15 percent by weight. The thus manufactured filter material will selectively remove cadmium from tobacco smoke. A conversion of carbon monoxide in the smoke to carbon dioxide with the oxygen present in the smoke is achieved catalytically when, in addition to the calcium salt, there is also used Fe-cations and/or Cu-cations in a quantity such that the amount of Fe and/or Cu present in said product is at least 1 tenth of the Ca-content. The Fe and Cu are conveniently incorporated in oxide or chloride form.

For the purpose of manufacturing a filter material having a combined catalytic and adsorbent effect for purifying gas or liquid, said cations can be selected so that at least 10 percent by weight of the amount of metal present in said product comprises at least one of the metals Cu, Ti, V, Cr, Fe, Co, Ni, Mo and Pd, whilst the remainder comprises at least one of the metals Ca, Mg, Ba and Al.

For the purpose of manufacturing a filter material suitable for purifying blood and like media, metal cations, preferably derived from a salt taken from the group Ca, Mg and Zr are reacted with a polyhexose derivative, there being preferably used a calcium salt which is conveniently added in an amount such that the quantity of Ca present in the finished, dry filter material is at least about 10 percent by weight.

Among those cellulose derivatives which can be used for manufacturing filter material according to the invention, can be mentioned by way of example carboxy methyl cellulose, sodium or potassium salt of carboxy methyl cellulose, derivatives of phthalic acids or succinic acid or other organic acids with cellulose and sulphuric acid derivative of cellulose. The cellulose in the above mentioned derivative can be replaced with, for example, starch or inulin.

The metal cations used in conjunction with the manufacture of the filter material according to the invention are suitably present in the form of metal salts, which should be soluble in water and which are bound in the liquid phase chemically to the cellulose or starch derivative, wherewith the reaction product, depending upon the salt used, is precipitated out either spontaneously or by adding a suitable precipitating agent, or is dried to the desired dry substance content. The reaction product can then be formed to the desired granular configuration, if this has not been done automatically, to prevent future dusting problems and, for example, is spray dried. The dried reaction product is then pyrolysed in a manner known per se in the absence of oxygen, the conditions under which the pyrolysis is effected being selected such that the pyrolysed product is either given active properties directly or the pyrolysed product can be subjected to a subsequent activating treatment, for example with the use of carbon dioxide.

Specific selective properties can be obtained by coating the granules, subsequent to said pyrolysis, with a permeable or semipermeable coating, for example with a layer of cellulose acetate. Active filter material according to the invention can be manufactured in accordance with the following examples:

EXAMPLE 1

2000 ml of a 10% aqueous solution of carboxy methyl cellulose was admixed with 500 ml of a 5% aqueous solution of $CaCl_2$ and 6 drops of concentrated $H_2SO_4$, whereafter the mixture was stirred for 1 hour at room temperature and then for 2 hours at a temperature of 70° C. The reaction product thus formed was filtered and then slurried and washed with 3000 ml of $H_2O$, whereafter it was re-filtered. The product was then dried in a spray-drying apparatus, whereafter it was pyrolysed and activated in a nitrogen atmosphere, by progressively raising its temperature to 850° C.

EXAMPLE 2

100 g of dried, cross-linked chromatographic gel having a grain size in dry state of between 0.5 and 0.75 mm and a maximum swellability of 5 ml/gram, was slurried by carefully stirring the same in 700 ml of distilled water at a temperature of 30° C., whereafter the gel was left to stand for 5 hours. The surplus water (about 200 ml) was then decantered and 10% calcium chloride solution was added in an amount corresponding to the amount of decantered water. The gel together with the added calcium chloride solution was then stirred carefully for 2 hours, and then left to settle for one hour. The surplus of the added solution was decantered, whereafter the sedimented gel particles were washed, filtered and dried, first at a temperature of 75° C. for 10 hours and finally at a temperature of 85° C. for a further 10 hours. The gel grains were then passed directly to a Büchner-funnel and finally dried at a pressure beneath ambient pressure at a temperature of 40° C. for one hour. The grain form was found to be substantially unchanged, whilst the swellability had fallen from the original 5 ml/gram to about 2 ml/gram. The product comprising the gel grains was then pyrolysed and activated in a nitrogen atmosphere by progressively raising its temperature to approximately 850° C.

The filter material according to the invention can be used on its own, or in mixture with other filter material, e.g. in mixture with an inert filler, such as cellulose, cellulose derivative, or diatomaceous earth. The polyhexose derivative, to which metal cations are chemically bound, may be formed from polyhexose during the transformation thereof to a polyhexose derivative.

The invention is not restricted to the aforedescribed embodiments, but can be modified within the scope of the inventive concept as disclosed in the following claims.

I claim:

1. A filter material for filtering gaseous or liquid media, comprising a product in the form of a matrix of activated carbon having uniformly dispersed therein at least one metal selected from the group consisting of Ca, Mg, Ba, Al, Cu and the transition metals, said product formed by chemical reaction between cations of at least one metal from said group of metals and anionic groups chemically bound to a substance consisting essentially of a polyhexose derivative followed by pyrolysis and activation of said product.

2. A filter material according to claim 1, wherein the activated carbon in said product originates from the pyrolysation and activation of a cellulose derivative or starch derivative which has been reacted with said cations.

3. A filter material according to claim 1, or 2, wherein the anionic groups chemically bound to said polyhexose derivative are carboxyl groups, sulphonic acid groups or phosphoric acid groups.

4. A filter material according to claims 1 or 2, wherein said polyhexose derivative has introduced therein from 1–3 metal cations per hexose unit.

5. A filter material according to claims 1 or 2, wherein said polyhexose derivative originates from a polyhexose or a derivative thereof which has been cross-linked with the aid of a bifunctional compound to from a porous three-dimensional network.

6. A filter material according to claim 5, wherein that said cross-linked polyhexose or polyhexose derivative has a swellability in water of 1–50 ml/gram.

7. A filter material according to claims 1 or 2, wherein said product contains from about 10–35 percent by weight of a metal selected from said group of metals.

8. A filter material according to claims 1 -or 2, wherein said product contains at least about 10 percent by weight Ca.

9. A filter material according to claim 8, wherein the product contains Ca in an amount of at least 15 percent by weight.

10. A filter material according to claim 8, wherein said product contains at least one of Fe and Cu in a quantity of at least one-tenth of the Ca-content.

11. A filter material according to claims 1 or 2, wherein at least 10 percent by weight of the amount of metal present in said product comprises at least one of the metals Cu, Ti, V, Cr, Fe, Co, Ni, Mo and Pd, and the remainder comprises at least one of the metals Ca, Mg, Ba and Al.

12. A filter material according to claims 1 or 2, wherein the metal dispersed therein is selected from the group consisting of Ca, Mg and Zr.

13. A filter material according to claims 1 or 2, in granular form.

14. A filter material according to claim 13 wherein the granules are coated with a permeable or semipermeable coating.

15. The filter material according to claim 1 in combination with an inert filler.

16. A filter containing a filter material according to claim 1.

17. A method of manufacturing a filter material for filtering gaseous or liquid media, comprising the steps of reacting cations of at least one metal selected from the group consisting of Ca, Mg, Ba, Al, Cu and the transition metals with anionic groups chemically bound to a substance consisting essentially of a polyhexose derivative; separating the reaction product; and pyrolysing and activating the reaction product to form a matrix of activated carbon having the metal uniformly dispersed therein.

18. A method according to claim 17, wherein cellulose or starch comprise the starting material for said polyhexose derivative.

19. A method according to claim 17 or 18, wherein the anionic groups chemically bound to said polyhexose derivative are carboxyl groups, sulphonic acid groups or phosphoric acid groups.

20. A method according to claims 17 or 18, wherein the polyhexose derivative contains from 1–3 metal ions per hexose unit.

21. A method according to claims 17 or 18, wherein the polyhexose derivative originates from a polyhexose or a polyhexose derivative which has been cross-linked with the aid of a bifunctional compound to form a porous three-dimensional network.

22. A method according to claim 21, wherein cross-linked polyhexose or cross-linked polyhexose derivative has a swellability in water of from 1–50 ml/gram.

23. A method according to claims 17 or 18, wherein approximately 10–35 percent by weight of the metal is introduced into said product.

24. A method according to claims 17 or 18, wherein calcium cations are used in a quantity so that the amount of Ca present in said product is at least about 10 percent by weight.

25. A method according to claim 24 wherein the product contains Ca in an amount of at least 15 percent by weight.

26. A method according to claim 24, comprising also reacting at least one of Fe and Cu-cations in an amount so that the amount present in said product is at least one-tenth of the Ca-content.

27. A method according to claims 17 or 18, wherein said cations are selected so that at least 10 percent by weight of the amount of metal present in said product comprises at least one of the metals Cu, Ti, V, Cr, Fe, Co, Ni, Mo and Pd, and the remainder comprises at least one of the metals Ca, Mg, Ba and Al.

28. A method according to claims 17 or 18, wherein reacting cations comprise at least one of the metals Ca, Mg and Zr.

29. A method according to claims 17 or 18, further comprising the step of granulating said product prior to pyrolysis and activation.

30. A method according to claim 29 further comprising the step of coating the granules with a permeable or semipermeable coating subsequent to pyrolysis.

* * * * *